United States Patent [19]

Hall, III

[11] Patent Number: 4,614,131
[45] Date of Patent: * Sep. 30, 1986

[54] STEER DRIVE FOR CROSS DRIVE TRANSMISSION

[75] Inventor: Arthur Hall, III, Indianapolis, Ind.

[73] Assignee: General Motors Corporation, Detroit, Mich.

[*] Notice: The portion of the term of this patent subsequent to Sep. 30, 2003 has been disclaimed.

[21] Appl. No.: 668,417

[22] Filed: Nov. 5, 1984

[51] Int. Cl.$^4$ .................. F16H 37/06; F16H 47/04
[52] U.S. Cl. .................................... 74/720.5; 74/687
[58] Field of Search ................ 74/687, 720, 720.5, 74/714, 677, 606 R

[56] References Cited

U.S. PATENT DOCUMENTS

| | | | |
|---|---|---|---|
| 3,253,688 | 5/1966 | Livezey | 74/720.5 X |
| 3,274,946 | 9/1966 | Simmons | 103/161 |
| 3,303,723 | 2/1967 | Ruf | 74/720.5 X |
| 3,378,119 | 4/1968 | Schaefer | 74/720.5 X |
| 3,383,953 | 5/1968 | Christenson | 74/720.5 |
| 3,425,296 | 2/1969 | Livezey | 74/720.5 |
| 3,869,939 | 3/1975 | Miyao et al. | 74/720.5 X |
| 4,286,478 | 9/1981 | Kessinger, Jr. | 74/720.5 X |

Primary Examiner—Kenneth J. Dorner
Assistant Examiner—Dirk Wright
Attorney, Agent, or Firm—Saul Schwartz

[57] ABSTRACT

A cross drive transmission has planetary differential gear units at opposite ends on the output center line of the transmission each having a ring gear output member connected to corresponding ones of the transmission output shafts, a planet carrier drive input member connected to a range gearing section of the transmission on the output center line thereof, and a sun gear reaction member. A hydrostatic pump powers a hydrostatic motor, each on the output center line, which is drive connected to a steer transfer sun gear. The steer transfer sun gear meshes with primary pinions on fixed axes and the primary pinions mesh with secondary pinions on fixed axes. Primary and secondary ring gears concentric with the output center line mesh with the primary and secondary pinion gears and are, therefore, rotatable in opposite directions at the same speed. First and second steer cross shafts on the output center line are drive connected to the primary and secondary ring gears and to respective ones of the reaction member sun gears to provide differential steering.

5 Claims, 2 Drawing Figures

STEER DRIVE FOR CROSS DRIVE TRANSMISSION

The invention herein described was made in the course of work under a contract or subcontract thereunder with the Department of Defense.

BACKGROUND OF THE INVENTION

1. Field of the Invention

This invention relates generally to differential steering cross drive transmissions for track laying type vehicles and, more particularly, to a new and improved steer drive system for such transmissions.

2. Description of the Prior Art

Differential steering cross drive transmissions conventionally include planetary steer differentials or combining gear sets associated with each of the two output shafts of the transmission. Each steer differential has an output member drive connected to the corresponding output shaft, a drive input member drive connected to the transmission input through a range gearing section of the transmission, and a normally stationary reaction member. Each reaction member is drive connected to the transmission input through a steer drive system operative to hold each stationary and, for steering, to rotate each at equal, infinitely variable speeds up to a maximum speed but in opposite directions so that a speed difference is developed between the output members and between the output shafts. Such cross drive steering transmissions typically have multiple, parallel center lines about which various elements of the range gearing and steer drive system rotate and, consequently, housings which consume substantial quantities of valuable space within the vehicle. A steer drive system according to this invention permits single center line compactness in a differential steering cross drive transmission and, therefore, represents an improvement over heretofore known steer drive systems.

SUMMARY OF THE INVENTION

The primary feature, then, of this invention is that it provides a new and improved steer drive system for a differential steering cross drive transmission. Another feature of this invention resides in the provision in the new and improved steer drive system of a hydrostatic pump/motor unit concentric with the transmission output center line, a pair of steer cross shafts concentric with the output center line drive connected to respective ones of a pair of reaction members in a pair of steer differentials on the output center line, and a steer transfer gear set on the output center line between the pump/motor unit and each of the steer cross shafts operative to rotate the latter at the same speed but in opposite directions. Still another feature of this invention resides in the provision in the new and improved steer drive system of a steer transfer gear set including a sun gear concentric with the output center line and driven by the hydrostatic unit, a plurality of primary pinion gears on fixed axes meshing with the sun gear, a corresponding plurality of identical secondary pinion gears on fixed axes meshing with the primary pinion gears, and a pair of identical ring gears meshing with respective pluralities of primary and secondary pinion gears and drive connected to respective ones of the steer cross shafts so that the steer cross shafts are driven at the same speed but in opposite directions. And a still further feature of this invention resides in the provision, in an alternative embodiment of the new and improved steer drive system, of a steer transfer gear set wherein the pair of identical ring gears is replaced by a rigid connection between the sun gear and one of the steer cross shafts and an additional sun gear identical to the original sun gear meshing with one of the pluralities of primary and secondary pinion gears and drive connected to the other of the steer cross shafts.

These and other features of this invention will be readily apparent from the following specification and from the drawings wherein.

Figure 1:
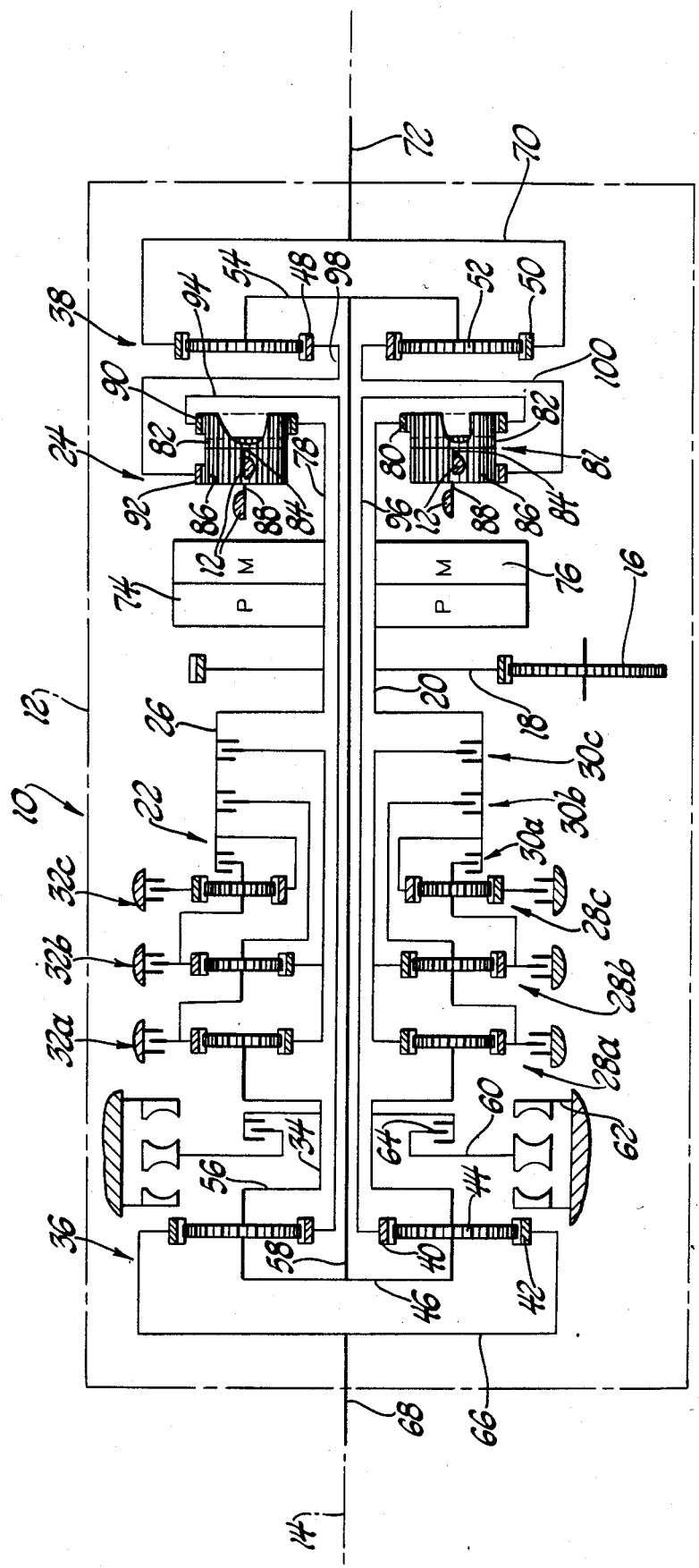
FIG. 1 is a schematic illustration of a differential steering cross drive transmission including a steer drive system according to this invention.

Referring now to the drawings wherein the same reference characters in each of the views identify identical elements and particularly to FIG. 1, a differential steering cross drive transmission 10 includes a housing 12 defining an output center line 14 which would be oriented transversely in a track laying type vehicle, not shown. The prime mover or engine of the vehicle, not shown, mounted longitudinally or transversely, drives a transfer gear 16 supported on the housing 12 or a transfer case, not shown, for rotation about an axis parallel to the output center line 14. The transfer gear 16 meshes with an input gear 18 rotatable about the output center line 14. The input gear 18 is drive connected to an input shaft 20 rotatable about the output center line 14 and projecting in opposite directions from the plane of input gear 18. The input shaft 20 channels engine power to a range gearing section 22 of the transmission and to a steer drive system 24 according to this invention.

The range gearing section 22, representative of multi-ratio planetary gear systems generally, includes a drum 26 drive connected to the input shaft 20 adjacent and to one side of the input gear 18. The range gearing section 22 further includes a plurality of planetary gear sets 28a, 28b and 28c, concentric with the output center line 14, each having a sun gear, a ring gear and a plurality of planet gears therebetween rotatably supported on a planet carrier. In known fashion, the planetary gear sets are connected in various combinations to the input shaft 20 by a plurality of selectively hydraulically actuated rotating clutches 30a, 30b and 30c on the drum 26 and a plurality of selectively hydraulically actuated brakes 32a, 32b and 32c on the housing 12. A tubular range output shaft 34, concentric with the output center line 14, is drive connected to the planet carrier of the planetary gear set 28a and represents the rotary power output member of the range gearing section 22 of the transmission. Output torque and speed at the range output shaft 34 are finite multiples of input torque and speed at the input shaft 20 in accordance with the particular power path through the planetary gear sets.

Adjacent the longitudinally outboard ends of the housing 12, the transmission includes a pair of steer differential planetary gear sets 36 and 38 concentric with output center line 14. Differential 36 includes a sun gear 40, a ring gear 42 and a plurality of planet gears 44, rotatably supported on a planet carrier 46. Similarly, differential 38 includes a sun gear 48, a ring gear 50 and a plurality of planet gears 52 rotatably supported on a carrier 54. The range output shaft 34 is drive connected to a hub 56 which, in turn, is drive connected to the carrier 46 of the differential 36. A drive cross shaft 58 on the output center line 14 extending substantially the length of the transmission 10 is drive connected at one end to the carrier 46 of the differential 36 and at the other end to the carrier 54 of the differential 38. Accordingly, torque at the range output shaft 34 is applied simultaneously to each of the carriers 46 and 54 which, therefore, function as the drive input members of the differentials 36 and 38, respectively. A hydrodynamic retarder rotor 60, cooperating with appropriate cavities in a stator 62 rigidly attached to the housing 12, is selectively drive connected to the range output shaft 34 through a rotating clutch 64.

The ring gear 42 in the differential 36 is drive connected by a hub 66 to a first output shaft 68 of the transmission aligned on the output center line 14. Similarly, the ring gear 50 in the differential 38 is drive connected by a hub 70 to a second output shaft 72 of the transmission aligned on the output center line 14 at the opposite end of the transmission from output shaft 68. Accordingly, the ring gears 42 and 50 represent the output members of the differentials 36 and 38, respectively.

Referring particularly to FIG. 1, the steer drive system 24 according to this invention includes an infinitely variable ratio transmission in the form of a hydrostatic pump/motor unit concentric with the output center line 14 including a pump 74 drive connected to the input shaft 20 and a motor 76 hydraulically drive connected to the pump 74. While not limited thereto the pump 74 and motor 76 are conveniently of the radial piston design as disclosed in detail in U.S. Pat. No. 3,274,946 issued Sept. 27, 1966 to E. E. Simmons. A steer output shaft 78 concentric with output center line 14 is drive connected to the motor 76 and rotatable thereby in opposite directions through infinite increments between a zero speed fixed condition and a maximum speed determined by the particular pump/motor unit employed.

The steer output shaft 78 is drive connected to a steer transfer sun gear 80 of a steer transfer gear set 81. The steer transfer sun gear 80 is rotatable about output center line 14 and meshes with each of a plurality of primary pinion gears 82 supported on the housing 12 for rotation about a corresponding plurality of fixed axes 84 parallel to and arrayed in a circle around the output center line 14. Each of the primary pinion gears 82 meshes with one of a corresponding plurality of secondary pinion gears 86 supported on the housing 12 for rotation about a corresponding plurality of fixed axes 88 parallel to and arrayed in a circle around the output center line 14. The primary and secondary pinion gears 82 and 86 have identical numbers of gear teeth so that they rotate in opposite directions at the same speed.

With continuing reference to FIG. 1, the steer drive system 24 further includes a primary ring gear 90 concentric with output center line 14 meshing with each of the primary pinion gears 82 and a secondary ring gear 92 concentric with the output center line 14 and meshing with each of the secondary pinion gears 86. A hub 94 is drive connected to the primary ring gear 90 and to one end of a first steer cross shaft 96 around the drive cross shaft 58 concentric with the output center line 14 and projecting through the motor 76, the pump 74, the input gear 18, the range gearing section 22 and the tubular range output shaft 34. The opposite end of the steer cross shaft 96 is drive connected to the sun gear 40 in the differential 36 whereby the sun gear 40 is in driving connection with the steer transfer sun gear 80 and is rotated by the latter through the primary pinion gears 82 and the primary ring gear 90 at the speed of and in the same direction as the primary ring gear 90. The secondary ring gear 92 is drive connected to one end of a relatively short second steer cross shaft 98 around the drive cross shaft 58 concentric with the output center line 14 by a hub 100, the other end of the steer cross shaft 98 being drive connected to the sun gear 48 in the differential 38 whereby the sun gear 48 is in driving connection with the steer transfer sun gear 80 and is rotated by the latter through the primary pinion gears 82, the secondary pinion gears 86, and the secondary ring gear 92 at the speed of and in the same direction as the secondary ring gear 92. The sun gears 40 and 48 represent the reaction members in the differentials 36 and 38, respectively.

For non-steering or straight line motion of the vehicle, the output shafts 68 and 72 of the transmission must rotate at the same speed and in the same direction. This condition obtains when the steer output shaft 78 is held stationary by the motor 76 while a mechanical power path is provided from the input shaft 20 to each of the drive input members of the differentials 36 and 38 through the range gearing section 22, the range output shaft 34, the hub 56, and the drive cross shaft 58. The reaction member sun gears 40 and 48 in the differentials 36 and 38, respectively, being drive connected to the steer output shaft 78 through the steer transfer sun gear 80, the primary and secondary pinion gears 82 and 86, the primary and secondary ring gears 90 and 92, and the steer cross shafts 96 and 98 are immobilized so that the ring gears 42 and 50 in the differentials are driven at maximum gear reduction at the same speed and in the same direction. Since the output shafts 68 and 72 are drive connected to the ring gears 42 and 50, respectively, the output shafts are likewise driven at the same speed and in the same direction for straight line movement.

The track laying vehicle moves in a curved path when a speed difference develops between the tracks, the radius or severity of the curve depending upon the magnitude of the speed difference. This condition obtains when the displacement members in the pump 74 and/or the motor 76 are stroked to initiate rotation of the steer output shaft 78 in a direction corresponding to the desired direction of turn and at a speed corresponding to the radius of turn desired. Because the steer transfer sun gear 80 is drive connected to the steer output shaft 78, the sun gear rotates in the same direction and at the same speed as the steer output shaft while simultaneously causing the primary pinion gears 82 to rotate in the opposite direction. The secondary pinion gears 86, meshing with the primary pinion gears and having the same number of teeth, rotate at the same speed as the primary pinion gears but in the opposite direction; that is, in the same direction as the steer transfer sun gear 80. Accordingly, the primary ring gear 90 rotates at a speed proportional to the speed of the steer transfer sun gear 80 but in the opposite direction while the secondary ring gear 92 rotates at the same speed as the primary ring gear but in the same direction as the steer transfer gear 80. The steer cross shafts 96 and 98, being drive connected to the primary and secondary ring gears 90 and 92, respectively, rotate the sun gears 40 and 48 in the differentials 36 and 38, respectively, at the same speed but in opposite directions. Because their speeds are the same but directions of rotation opposite, one of the differential sun gears causes the corresponding differential ring gear to increase in speed by the same amount that the other differential sun gear causes the other corresponding differential ring gear to decrease in speed. With a speed difference thus created between the differential ring gears 42 and 50, and hence between the output shafts 68 and 72, respectively, one of the vehicle tracks speeds up while the other slows down so that the vehicle traverses a curved path of motion. Because the radius of curvature depends upon the magnitude of the speed difference between the output shafts 68 and 72, the vehicle will traverse a path of progressively shorter radius as the speed of the steer output shaft 78 increases from zero toward the maximum capacity of the motor 76.

Figure 2:
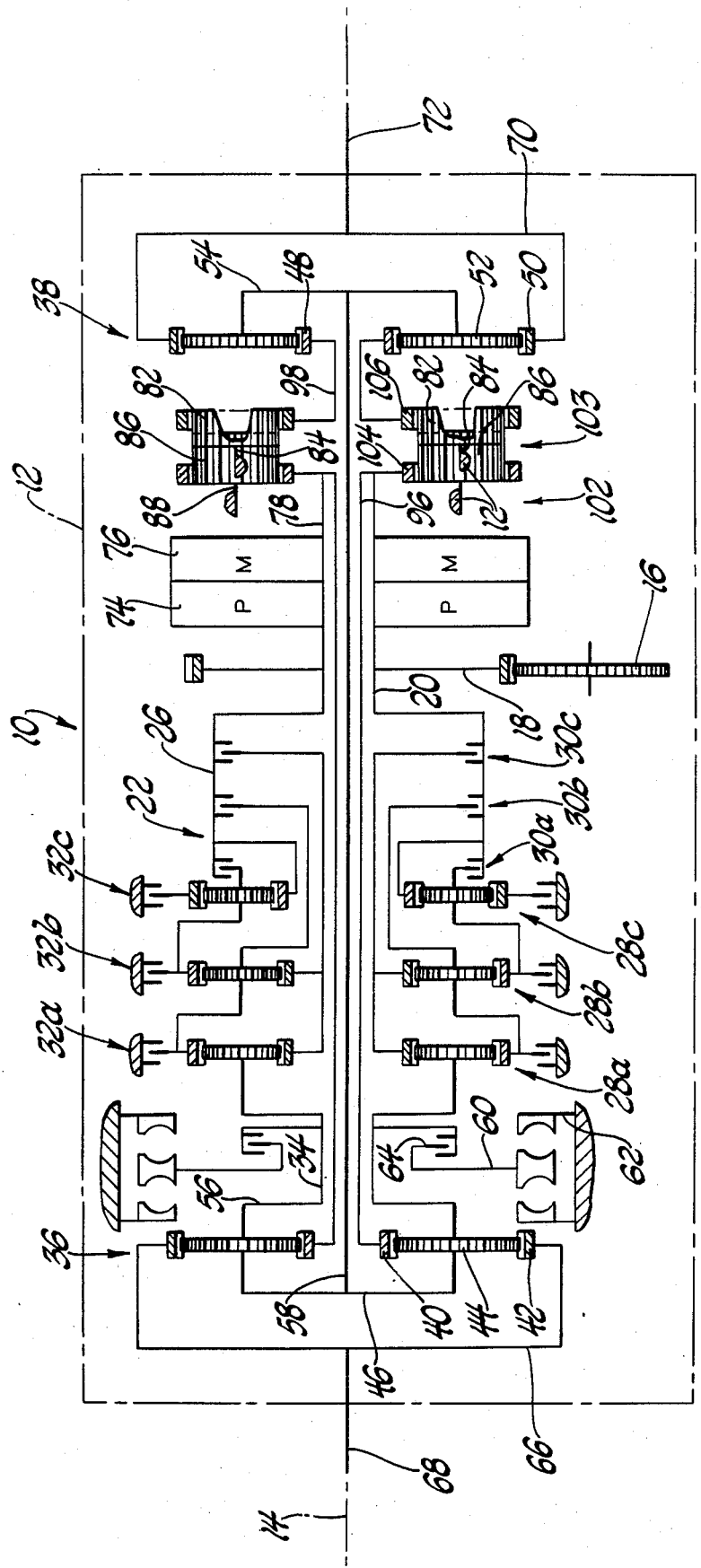
FIG. 2 is similar to FIG. 1 but showing a differential steering cross drive transmission having a modified steer drive system according to this invention.

Referring, now, to FIG. 2 of the drawings, the differential cross drive steering transmission 10 includes a steer drive system 102 including a modified steer transfer gear set 103. The steer drive system 102 has several components in common with the steer drive system 24 including the pump 74 drive connected to the input gear 18, the motor 76 hydraulically drive connected to the pump 74, the steer output shaft 78 drive connected to the motor 76, and the meshing primary and secondary pinion gears 82 and 86 supported on the housing 12 for rotation about corresponding ones of the fixed axes 84 and 88 arrayed in circles around the output center line 14 of the transmission. The modified steer transfer gear set 103 includes a first steer transfer sun gear 104 drive connected to the steer output shaft 78 and to the first steer cross shaft 96. Accordingly, the sun gear 40 in the differential 36 rotates at the same speed and in the same direction as the first steer transfer sun gear 104. The modified steer transfer gear set 103 still further includes a second steer transfer sun gear 106 drive connected to the second steer cross shaft 98. Accordingly, the sun gear 48 in the differential 38 rotates at the same speed and in the same direction as the second steer transfer sun gear 106. The first steer transfer sun gear 104 meshes with each of the secondary pinion gears 86 while the second steer transfer sun gear 106 meshes with each of the primary pinion gears 82.

Straight line motion of the vehicle, once again, obtains when the reaction member sun gears 40 and 48 in the differentials 36 and 38 are held stationary while a mechanical power path is defined between the input shaft 20 and the drive input member planet carriers 46 and 54 in the differentials 36 and 38. The mechanical power path is the same as described hereinbefore. The reaction member sun gear 40 is held stationary through steer cross shaft 96 and the direct connection of the latter to the stationary steer output shaft 78. The reaction member sun gear 48 is held stationary through steer cross shaft 98, steer transfer sun gear 106, the meshing primary and secondary pinion gears 82 and 86, and the steer transfer sun gear 104.

When steer output shaft 78 is rotated by motor 76 in one direction or the other, the first steer transfer sun gear 104 rotates in the direction of and at the speed of the steer output shaft. The sun gear 104 rotates the secondary pinion gears 86 in the opposite direction while the secondary pinion gears rotate the primary pinion gears at the same speed but in the same direction as the first steer transfer sun gear 104. The secondary pinion gears 82 rotate the second steer transfer sun gear 106 at the same speed as the first steer transfer sun gear 104 but in a direction opposite thereto. Accordingly, through the connections provided by the steer transfer cross shafts 96 and 98, the sun gears 40 and 48 in the differentials 36 and 38, respectively, are rotated in opposite directions at the same speed so that a speed difference once again develops between the output shafts 68 and 72 whereby the vehicle is caused to traverse a curved path of motion.

The embodiments of the invention in which an exclusive property or privilege is claimed are defined as follows:

1. In a differential steer cross drive transmission including a housing having a pair of output shafts supported thereon at opposite ends thereof for rotation on an output center line of said housing, a pair of differential gear units at opposite ends of said housing concentric with said output center line each including a drive output member connected to a corresponding one of said output shafts and a drive input member and a reaction member, and range gear means concentric with said output center line between an input of said transmission and each of said differential gear unit drive input members, a steer drive system comprising, an infinitely variable ratio transmission means concentric with said output center line having an input connected to said transmission input and a steer drive output, a primary pinion gear on said housing rotatable about a fixed axis parallel to said output center line, a secondary pinion gear on said housing meshing with and having the same number of teeth as said primary pinion gear and rotatable about a fixed axis parallel to said output center line, a steer transfer sun gear concentric with said output center line meshing with one of said primary and said secondary pinion gears, means drive connecting said steer drive output and said steer transfer sun gear, a first steer cross shaft means rotatable on said output center line drive connected to said reaction member in one of said differential gear units, a second steer cross shaft means rotatable on said output center line drive connected to said reaction member in the other of said differential gear units, means drive connecting one of said first and said second steer cross shaft means to one of said primary and said secondary pinion gears so that said one of said first and said second steer cross shaft means rotates in the same direction as said steer transfer sun gear, and means drive connecting the other of said first and said second steer cross shaft means to the other of said primary and said secondary pinion gears so that said other of said first and said second steer cross shaft means rotates in the direction opposite of said steer transfer sun gear at the same speed as said one of said first and said second steer cross shaft means.

2. The steer drive system recited in claim 1 wherein said infinitely variable ratio transmission means includes a hydrostatic pump concentric with said output center line and a hydrostatic motor concentric with said output center line hydraulically drive connected to said pump, said pump being drive connected to said transmission input and said motor being drive connected to said steer drive output.

3. The steer drive system recited in claim 2 wherein said one of said first and said second steer cross shaft means is drive connected to said one of said primary and said secondary pinion gears by a first ring gear concentric with said output center line meshing with said one of said first and said second pinion gears, and said other of said first and said second steer cross shaft means is drive connected to said other of said primary and said secondary pinion gears by a second ring gear concentric with said output center line having the same number of gear teeth as said first ring gear and meshing with said other of said primary and said secondary pinion gears.

4. The steer drive system recited in claim 2 wherein said one of said first and said second steer cross shaft means is rigidly connected to said one of said primary and said secondary pinion gears, and said other of said first and said second steer cross shaft means is drive connected to said other of said primary and said secondary pinion gears by a second steer transfer sun gear rotatable on said output center line and meshing with said other of said primary and said secondary pinion gears.

5. In a differential steering cross drive transmission including a housing having a pair of output shafts supported thereon at opposite ends thereof for rotation on an output center line of said housing, a pair of planetary differential gear units at opposite ends of said housing concentric with said output center line each including a ring gear drive output member connected to a corresponding one of said output shafts and a planet carrier drive input member and a sun gear reaction member, and range gear means concentric with said output center line between an input of said transmission and each of said planet carrier drive input members, a steer drive system comprising, a hydrostatic pump concentric with said output center line and drive connected to said transmission input, a hydrostatic motor concentric with said output center line and hydraulically drive connected to said motor and drive connected to said steer drive output, a plurality of primary pinion gears arrayed in a circle around said output center line and supported on said housing for rotation about a corresponding plurality of fixed axes parallel to said output center line, a corresponding plurality of secondary pinion gears having the same number of gear teeth as said primary pinion gears and meshing with the latter arrayed in a circle around said output center line and supported on said housing for rotation about a corresponding plurality of fixed axes parallel to said output center line, a steer transfer sun gear concentric with said output center line meshing with each of said plurality of primary pinion gears and drive connected to said steer drive output, a first steer cross shaft rotatable on said output center line having one end drive connected to said sun gear reaction member in one of said planetary differential gear units, a second steer cross shaft rotatable on said output center line having one end drive connected to said sun gear reaction member in the other of said planetary differential gear units, a primary ring gear concentric with said output center line meshing with each of said plurality of primary pinion gears, a secondary ring gear having the same number of gear teeth as said primary ring gear concentric with said output center line and meshing with each of said plurality of secondary pinion gears, means drive connecting said primary ring gear to the other end of said first steer cross shaft, and means drive connecting said secondary ring gear to the other end of said second steer cross shaft.

* * * * *